US010266992B2

(12) United States Patent
Halahmi et al.

(10) Patent No.: US 10,266,992 B2
(45) Date of Patent: Apr. 23, 2019

(54) PERFORATED GEOCELL

(71) Applicant: PRS MEDITERRANEAN LTD., Tel Aviv (IL)

(72) Inventors: Izhar Halahmi, Hod-Hasharon (IL); Oded Erez, Tel Aviv (IL)

(73) Assignee: GeoTech Technologies Ltd., Tel Aviv (IL)

( * ) Notice: Subject to any disclaimer, the term of this patent is extended or adjusted under 35 U.S.C. 154(b) by 127 days.

(21) Appl. No.: 15/114,343

(22) PCT Filed: Jan. 26, 2015

(86) PCT No.: PCT/IB2015/000575
§ 371 (c)(1),
(2) Date: Jul. 26, 2016

(87) PCT Pub. No.: WO2015/110922
PCT Pub. Date: Jul. 30, 2015

(65) Prior Publication Data
US 2017/0241083 A1    Aug. 24, 2017

Related U.S. Application Data

(60) Provisional application No. 61/931,848, filed on Jan. 27, 2014.

(51) Int. Cl.
*E01C 3/00* (2006.01)
*E02D 17/20* (2006.01)
*E02D 17/18* (2006.01)
*E02D 3/00* (2006.01)
*E02D 3/02* (2006.01)
*E01C 3/04* (2006.01)

(52) U.S. Cl.
CPC ............... *E01C 3/006* (2013.01); *E01C 3/04* (2013.01); *E02D 3/00* (2013.01); *E02D 3/02* (2013.01); *E02D 17/18* (2013.01); *E02D 17/202* (2013.01)

(58) Field of Classification Search
CPC ... E01C 3/006; E01C 3/04; E02D 3/00; E02D 3/02; E02D 17/18; E02D 17/202
See application file for complete search history.

(56) References Cited

U.S. PATENT DOCUMENTS 4,778,309 A * 10/1988 Bach ..................... E02D 29/02
                                                      405/284
4,804,293 A *  2/1989 Varkonyi ................ E02B 3/126
                                                      405/15
4,965,097 A    10/1990 Bach
(Continued)

FOREIGN PATENT DOCUMENTS

WO        WO 97/16604         5/1997

OTHER PUBLICATIONS

Extended European Search Report for PCT Application No. PCT/IB2015/000575; dated Apr. 10, 2017.
(Continued)

*Primary Examiner* — Benjamin F Fiorello
(74) *Attorney, Agent, or Firm* — Fay Sharpe LLP

(57) ABSTRACT

A perforated geocell is made from a plurality of strips that form cells. Each cell wall has a single pattern of perforations spaced evenly over the cell wall. This avoids uneven distributions of stress over the cell wall, reducing deformation of the geocell.

15 Claims, 16 Drawing Sheets

(56) References Cited

U.S. PATENT DOCUMENTS

| | | | | |
|---|---|---|---|---|
| 5,269,631 | A * | 12/1993 | Mercer | B29C 55/04 |
| | | | | 264/288.4 |
| 6,296,924 | B1 | 10/2001 | Bach | |
| 6,395,372 | B1 | 5/2002 | Bach | |
| 7,501,174 | B2 * | 3/2009 | Halahmi | B29C 47/0028 |
| | | | | 264/171.1 |
| 7,674,516 | B2 | 3/2010 | Halahmi et al. | |
| 8,092,122 | B2 * | 1/2012 | Senf | E02D 17/20 |
| | | | | 24/458 |
| 9,103,087 | B2 * | 8/2015 | Munro | E02D 3/005 |
| 9,249,552 | B2 * | 2/2016 | Tyagi | B29C 55/04 |
| 2006/0147276 | A1 | 7/2006 | Lin et al. | |
| 2010/0080659 | A1 | 4/2010 | Halahmi et al. | |
| 2014/0205790 | A1 * | 7/2014 | Bach | E02D 17/20 |
| | | | | 428/99 |

OTHER PUBLICATIONS

Emersleben et al.; The influence of hoop stresses and earth resistance on the reinforcement mechanism of single and multiple geocells; 9$^{th}$ International Conference on Goesynthetics, Brazil, 2010; pp. 713-716.

International Search Report for PCT Application No. PCT/IB2015/000575; dated Dec. 18, 2015.

* cited by examiner

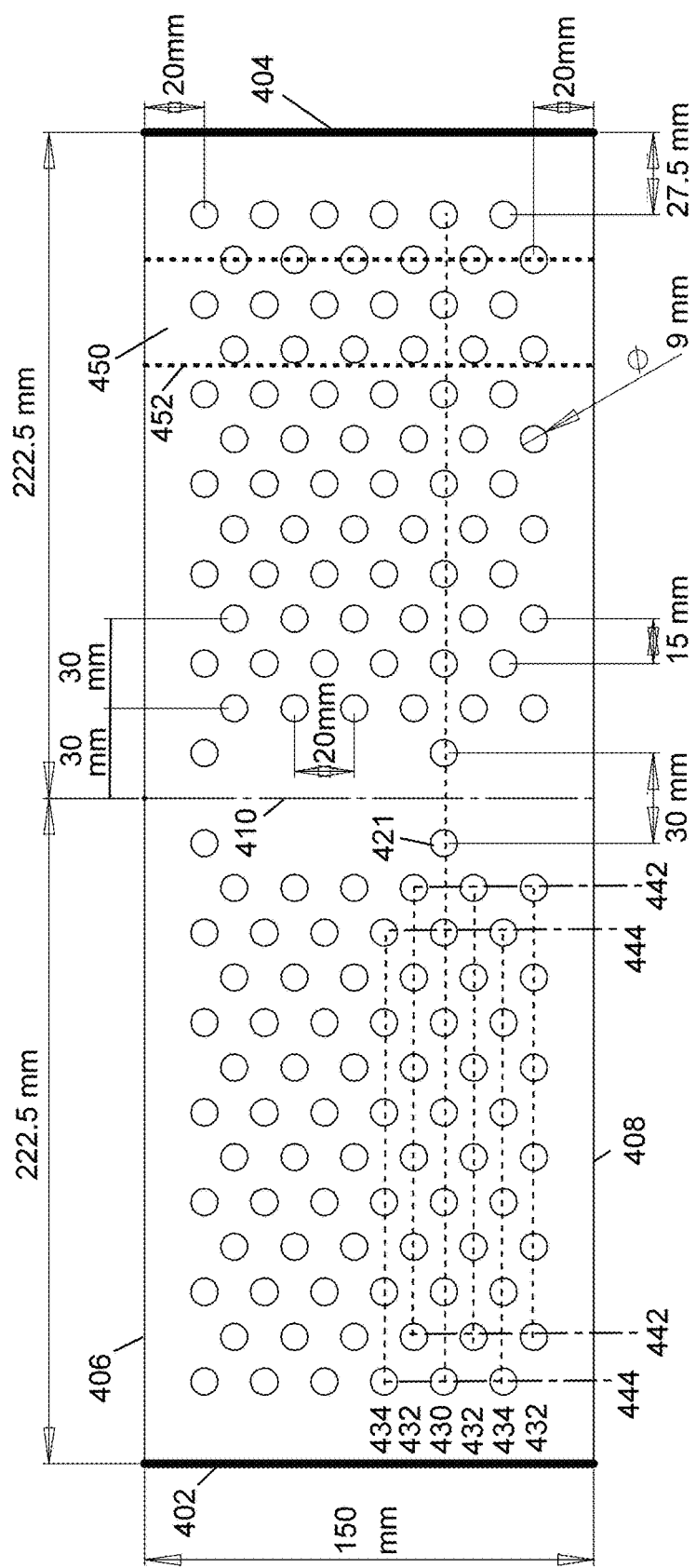

PERFORATED GEOCELL

CROSS-REFERENCE TO RELATED APPLICATIONS

This application claims priority to U.S. Provisional Patent Application Ser. No. 61/931,848, filed on Jan. 27, 2014. That application is hereby incorporated by reference in its entirety.

BACKGROUND

The present disclosure relates to perforated geocells that have reduced tendency to deform when loaded during service. Also described herein are various systems using such geocells.

A geocell (also known as a cellular confinement system (CCS)) is a three-dimensional geosynthetic product originally designed by the United States Army Corps of Engineers (ACE) for fast deployment of troops on sandy dunes which generally could not support the load of heavy vehicles (e.g. trucks, tanks, etc). A geocell is an array of containment cells resembling a "honeycomb" structure that can be filled with infill, which can be cohesionless soil, sand, gravel, ballast, or any other type of aggregate. Confinement is provided in all directions, and internal force vectors act within each cell against all the walls. Geocells are used in civil engineering applications to prevent erosion or provide lateral support, such as retaining walls for soil; alternatives for sandbag walls or gravity walls; for roadway, pavement, and railway foundations; and for channel lining. Geocells also provide efficient reinforcement for relatively fine infills, such as sand, loam, and quarry waste.

Geocells are usually perforated, with apertures drilled or punched in the cell walls. The perforations provide improved friction with the infill, and also help with drainage. For example, U.S. Pat. Nos. 6,296,924 and 6,395,372 illustrate the use of perforations which are applied in two or four distinct "blocks" or groups, and which are separated by non-perforated "belts" which allegedly help maintain sufficient wall stiffness, as well as separate the perforations from the areas where welding will occur. FIG. 1 is a copy of FIG. 2 of U.S. Pat. No. 6,395,372. Here, four groups of perforations are seen, separated by belts in the areas labeled D3 and D6. This unbalanced distribution of perforations causes weakening of the perforated areas compared to the non-perforated belts, and result in an overall weakening of the cell wall. This can cause premature failure of the geocell at loads much lower than designed.

It would be desirable to provide perforated geocells that have improved stress and strain distribution over the entire cell wall, improved response to loads due to an even strain over the compete strip, improved strength due to the avoidance of weakened "blocks", and that avoid uneven distribution of stresses.

BRIEF DESCRIPTION

The present disclosure relates to a geocell whose cell walls have perforations arranged in various patterns. These patterns provide the benefits of perforations and providing a more uniform, less uneven distribution of stresses across the cell wall. This reduces local unbalanced deformation during service (i.e. use) and increases the average load which can be handled by the geocell.

Disclosed in various embodiments is a geocell formed from a plurality of polymeric strips, adjacent strips being bonded together along weld lines to form a plurality of cells having cell walls when stretched in a direction perpendicular to the faces of the strips; wherein at least one strip contains a cell wall having a first edge seam, a second edge seam, a central seam, and a plurality of perforations that have a diameter of from about 7 mm to about 30 mm; and wherein the perforations are arranged in a single pattern such that any ribbon having a width of 40 mm and a length equal to and parallel to the first edge seam will have at least one perforation.

The perforations may have a diameter from about 7 mm to about 15 mm. In particular embodiments, the perforations are circular and have a diameter from about 7 mm to about 15 mm. In others, the perforations are non-circular and have an area equal to a circle having a diameter from about 7 mm to about 30 mm.

In some embodiments, the perforation pattern is such that when the cell wall is loaded in tensile mode with a load of 6.0 kilonewtons (kN)/meter until the strip increases in length by 12%, the increase in perforation diameter in the stress direction (average of at least 3 perforations in the most affected line) is at most 15%. The load is measured in the stress direction. For example, if the strip has a starting length of 100 cm and then increases to 112 cm (i.e. a 12% increase), then a perforation in the strip having a starting diameter of 10 mm can increase to at most 11.5 mm (a 15% increase).

In various embodiments, the strips have a wall thickness of 0.25 mm to 1.7 mm. In others, the strips have a wall thickness of 0.5 mm to 1.35 mm. The cell walls of the geocell can be textured or smooth. It is noted the texture of the cell wall can be the same on both sides, or can be different between the two sides.

The distance between the first edge seam and the second edge seam in an un-expanded state can be at least 250 mm. Sometimes, the total area of the perforations in the perforated cell wall is from about 5% to about 18% of the area of the perforated cell wall.

Also disclosed in different embodiments is a geocell formed from a plurality of polymeric strips, adjacent strips being bonded together along weld lines to form a plurality of cells having cell walls when stretched in a direction perpendicular to the faces of the strips; wherein at least one strip contains a cell wall having a first edge seam, a second edge seam, a central seam, and a plurality of perforations that have a diameter of from about 7 mm to about 30 mm; and wherein the perforations are arranged in a single pattern such that any ribbon having a width of 40 mm and a length equal to and parallel to the first edge seam will have at least one perforation; and wherein the perforations closest to the first edge seam are spaced from the first edge seam by an edge distance, as measured from the center of the perforations.

The edge distance can be from 0 mm to 30 mm. The distance between adjacent perforations can be from 1 times the edge distance to 5 times the edge distance. Sometimes, the edge distance is 35 mm or less.

These and other embodiments are described in more detail below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 5 is a second plan view of the first exemplary cell wall of the present disclosure, showing different features of the pattern of perforations.

DETAILED DESCRIPTION

Figure 1:
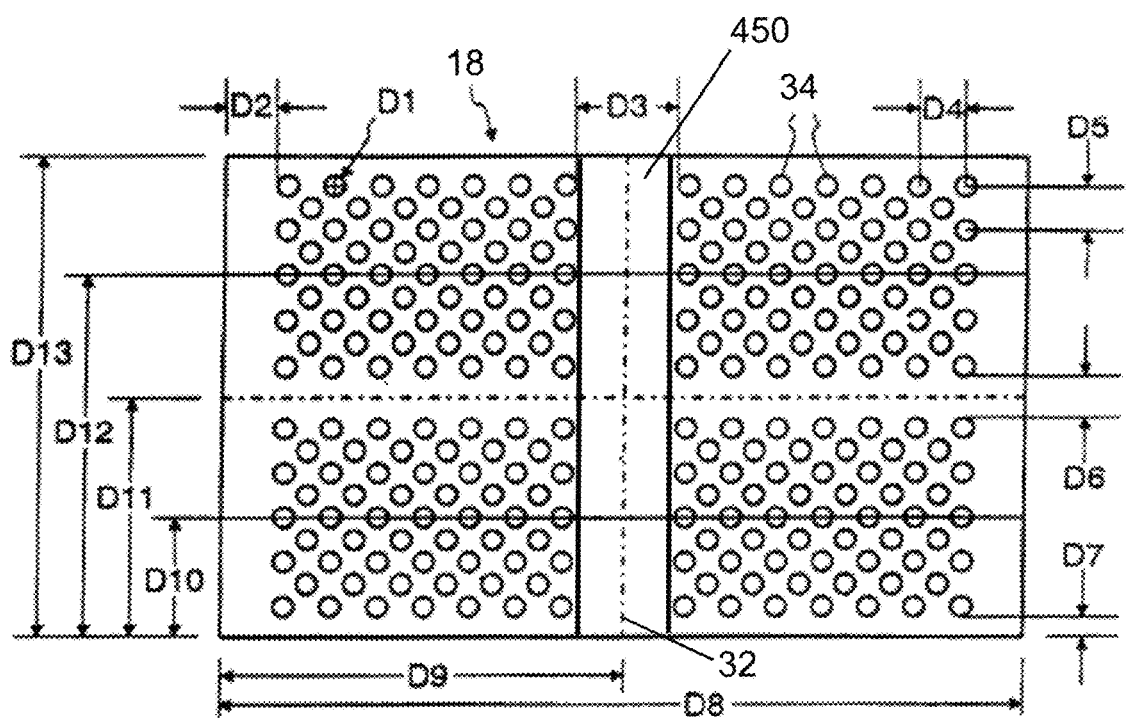
FIG. 1 is a copy of FIG. 2 of U.S. Pat. No. 6,395,372, showing a geocell cell wall with four groups of perforations and two non-perforated belts.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 mm to 10 mm" is inclusive of the endpoints, 2 mm and 10 mm, and all the intermediate values).

A value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4."

Briefly, the present disclosure relates to the use of geocells, not geogrids. A geocell is a three-dimensional array of containment cells resembling a "honeycomb" structure that is filled with infill, with internal force vectors acting within each cell. A geogrid is a two-dimensional structure formed from a network of ribs arranged to make apertures, which is used to provide biaxial tensile reinforcement to soil. A geogrid has a flat planar structure, and lacks an effective height. A geocell and a geogrid can be distinguished by their vertical height/thickness. A geocell has a vertical thickness of at least 20 mm, whereas a geogrid has a vertical thickness of from about 0.5 mm to 2 mm.

Figure 2:
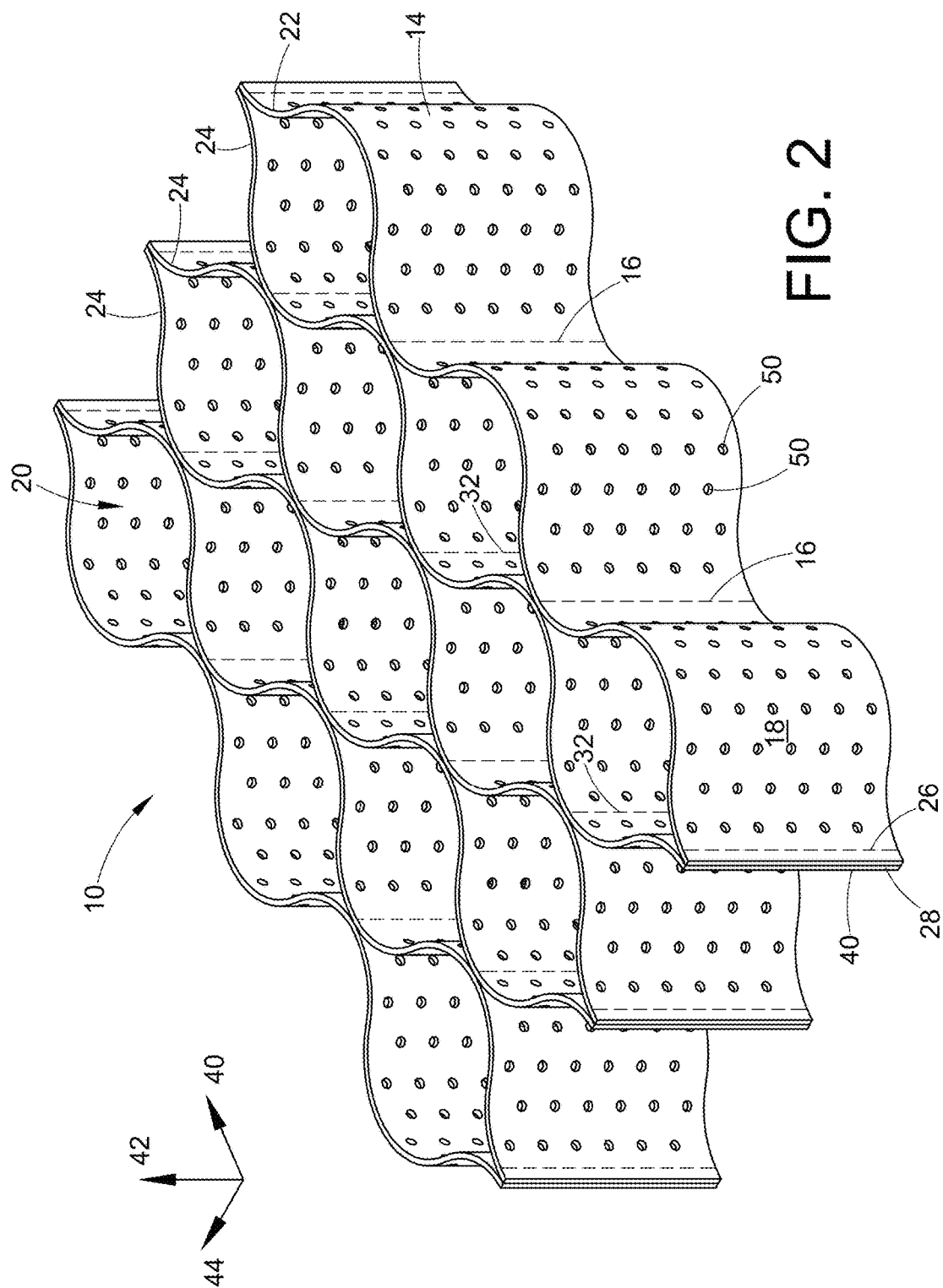
FIG. 2 is a perspective view of a geocell of the present disclosure in its expanded state.

FIG. 2 is a perspective view of a perforated geocell of the present disclosure in its expanded state. The geocell 10 comprises a plurality of polymeric strips 14. Adjacent strips are bonded together along discrete physical seams 16. The bonding may be performing by bonding, sewing or welding, but is generally done by welding (e.g. ultrasonic welding). The portion of each strip between two seams 16 forms a cell wall 18 of an individual cell 20. Each cell 20 has cell walls made from two different polymeric strips. The strips 14 are bonded together so that when expanded, a honeycomb pattern is formed from the plurality of strips. For example, outside strip 22 and inside strip 24 are bonded together at seams 16 which are regularly spaced along the length of strips 22 and 24. A pair of inside strips 24 is bonded together along seams 32. Each seam 32 is between two seams 16. As a result, when the plurality of strips 14 is stretched or expanded in a direction perpendicular to the faces of the strips, the strips bend in a sinusoidal manner to form the geocell 10. At the edge of the geocell where the ends of two polymeric strips 22, 24 meet, an end weld 26 (also considered a joint) is made a short distance from the end 28 to form a short tail 30 which stabilizes the two polymeric strips 22, 24. This geocell may also be referred to as a section, particularly when combined with other geocells over a larger area than could be practically covered by a single section. Each cell wall has perforations 50 which connect the interior of each cell to the exterior of each cell. The perforations extend entirely through the cell wall.

Figure 3:
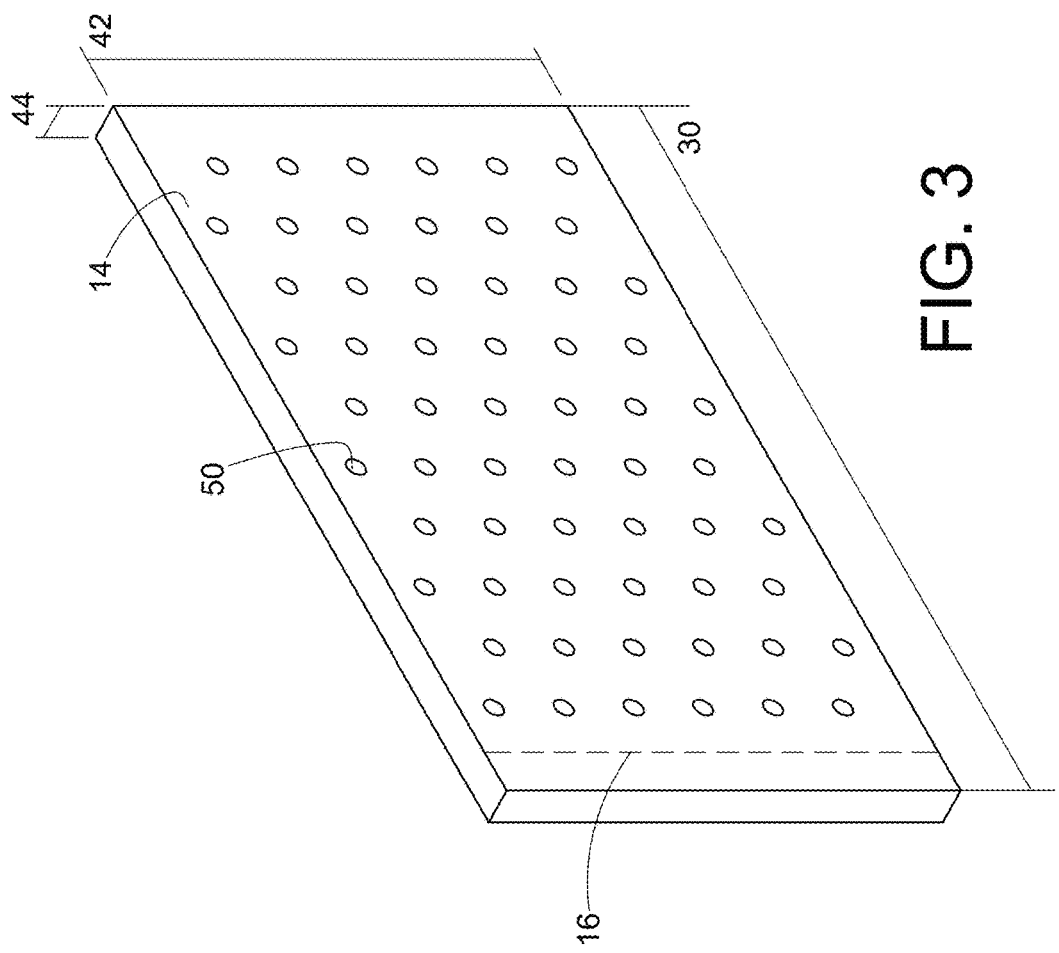
FIG. 3 is a close-up perspective view of a polymeric strip of the present disclosure used to make the perforated geocell.

FIG. 3 is a close-up perspective view of a polymeric strip 14 showing the length 40, height 42, and width 44, with a seam 16 illustrated for reference. This is not a view of a cell wall, but of a polymeric strip. The length 40, height 42, and width 44 are measured in the direction indicated. The length is measured when the geocell is in its folded or compressed state. In the compressed state, each cell 20 may be considered to have no volume, whereas the expanded state generally refers to when the geocell has been expanded to its maximum possible capacity. In embodiments, the geocell height 43 is from about 50 millimeters (mm) to about 300 mm. The geocell cell size (measured as the distance between seams in the un-folded state) can be from about 200 mm to about 600 mm, and in more particular embodiments from about 300 mm to about 400 mm. The wall thickness 44 can be from 0.25 mm to 1.7 mm, including from 0.3 mm to 1.5 mm, or from 0.5 mm to 1.35 mm, or from 0.4 mm to 1.2 mm. Perforations 50 are also visible here. The cell walls can also be textured or smooth.

The geocells (and the polymeric strips) can be made from polyethylene (PE), medium density polyethylene (MDPE) and/or high density polyethylene (HDPE), polypropylene (PP), or from other polymeric alloys, for example a blend of polyethylene and a polyamide. The strips are welded together in an offset manner, with the distance between the welded seams of a given cell being from about 200 mm to about 600 mm, including at least 250 mm.

Referring again to prior art FIG. 1, the perforations illustrated here are not evenly distributed across the cell wall. Rather, the perforations are placed in four groups, one in each quadrant, with more than one non-perforated belts separating the groups of perforations. In particular, the belt marked D3 is present in this prior art geocell to avoid the risk of a perforation in this area to be welded to other strips. In this figure, D2 is 0.8125 inches (20.6 mm), D3 is 1.6250 inches (41.3 mm), D4 is 0.75 inches (19.1 mm), D5 is 0.75 inches (19.1 mm), D6 is 0.6250 inches (15.9 mm), D8 is 13 inches (330.2 mm), and D1 is between 3 mm and 17 mm.

Perforations are intended to provide friction between the cell wall and the infill, as well as drainage. Large non-perforated areas will have poorer friction and thus poorer confinement of the infill within the cell wall. An uneven distribution of preforations negatively affects performance, especially in demanding applications, such as load support, runways, channels, parking lots, industrial floors, railway and walls. Cells with an uneven distribution of perforations tend to deform and lose their confinement at loads much lower than designed and failure occurs much earlier. The perforated areas are also subjected to large deformations at relatively low average loads because stress is concentrated into smaller portions of the cell wall. This reduces the load that the geocell can take, when the perforations are distributed unevenly across the cell wall.

Generally speaking, the perforated geocells of the present disclosure have perforations arranged in a pattern so as to meet at least one of two different tests. In the first test, at least one of the strips used to form the geocell contains perforations placed in a pattern such that in a cell wall, any ribbon having a length parallel to the edge seams of the strip and a width of 40 mm will have at least one perforation. The ribbon will have a complete perforation, not just a portion of a perforation, or put another way the perforation will not extend across a border of the ribbon, or a border will not pass through the perforation. In the second test, a cell wall of the geocell includes a pattern of perforations such that when the cell wall is loaded in tensile mode with a load of 6.0 kN/m for wall thicknesses of 1.2 mm to 1.5 mm or 0.4 kN/m for wall thicknesses of 1.0 mm to 1.2 mm until the strip increases in length by 12%, the increase in perforation diameter in the stress direction (average of at least 3 perforations in the most affected line) is at most 15%. The measurement is taken in the line of perforations most affected by the stress, and the value of the increase in perforation diameter is an average of at least 3perforations in that line. More specifically, if the cell wall is loaded in tensile mode with a load of 6.0 kN/m for wall thicknesses of 1.2 mm to 1.5 mm or 0.4 kN/m for wall thicknesses of 1.0 mm to 1.2 mm at 23° C. until the strip has increased its length by 12%, and the measurements are then taken, the increase in perforation diameter in the stress direction (average of at least 3 perforations in the most affected line) is at most 15%. The second test is performed using the testing machines and methods described in ASTM D4595-05or ISO 10319:2008, suitably modified for use with a test strip. Generally, the test strip is taken from a cell wall. The strip of the cell wall that is tested has a length which is the distance between the edge seams of the cell wall, and has a width which is equal to the cell height (see FIG. 4A for reference). The load is applied perpendicular to the edge seams.

The testing strip is now described in more detail. A strip is taken from a cell wall, the strip running from a first edge seam to a second edge seam. For strips having a wall thickness of 1 mm to 1.2 mm, the strip is loaded at 4 kN/m, and for strips having a wall thickness of 1.2 mm to 1.5 mm, the strip is loaded at 6.0 kN/m. The strip is permitted to deform until its length is extended to 112% of the original length.

The load is then released from the strip, and the strip is moved to room temperature, and the strip is permitted to relax for 15 minutes. The increase in the length of the strip is measured. The diameters of the three most affected perforations are then measured in the stress direction, and averaged, and this increased diameter divided by the original diameter is termed the perforation increase (PD). If PD is 115% or less, then the second test described above has been met.

The perforated geocells of the present disclosure distribute their stress more evenly, so that the load can be increased relative to the prior art, but will deform without local plastic yielding of the cell wall. In contrast, some of the cell wall of prior art geocells will plastically deform (usually the most perforated area) under an equal load. Plastic deformation may lead to creep rupture and premature catastrophic failure. When the geocells fail, they generally do so along the seams, without deformation of the perforations and the cell wall.

These geocells are useful in applications such as reinforcement of roads, pavements, railways, parking lots; linings in channels, ponds, reservoirs, landfills, dams, barriers, terraces; and retaining walls.

FIGS. 4-10 show cell walls which are contemplated by the present disclosure. Generally, these cell walls have a single perforation pattern where the perforations are distributed so as to reduce deformation. Every ribbon that is cut parallel to the edge seam and has a 40-mm width will have at least one perforation. It is noted that this ribbon will have a complete perforation, not just a portion of a perforation. It is noted that in these figures, the perforations are shown as circles and are referred to as such, but that perforations can also be of a non-circular shape. These cell walls will also pass the second and third tests referred to above (i.e. related to deformation of the cell wall).

Figure 4A:
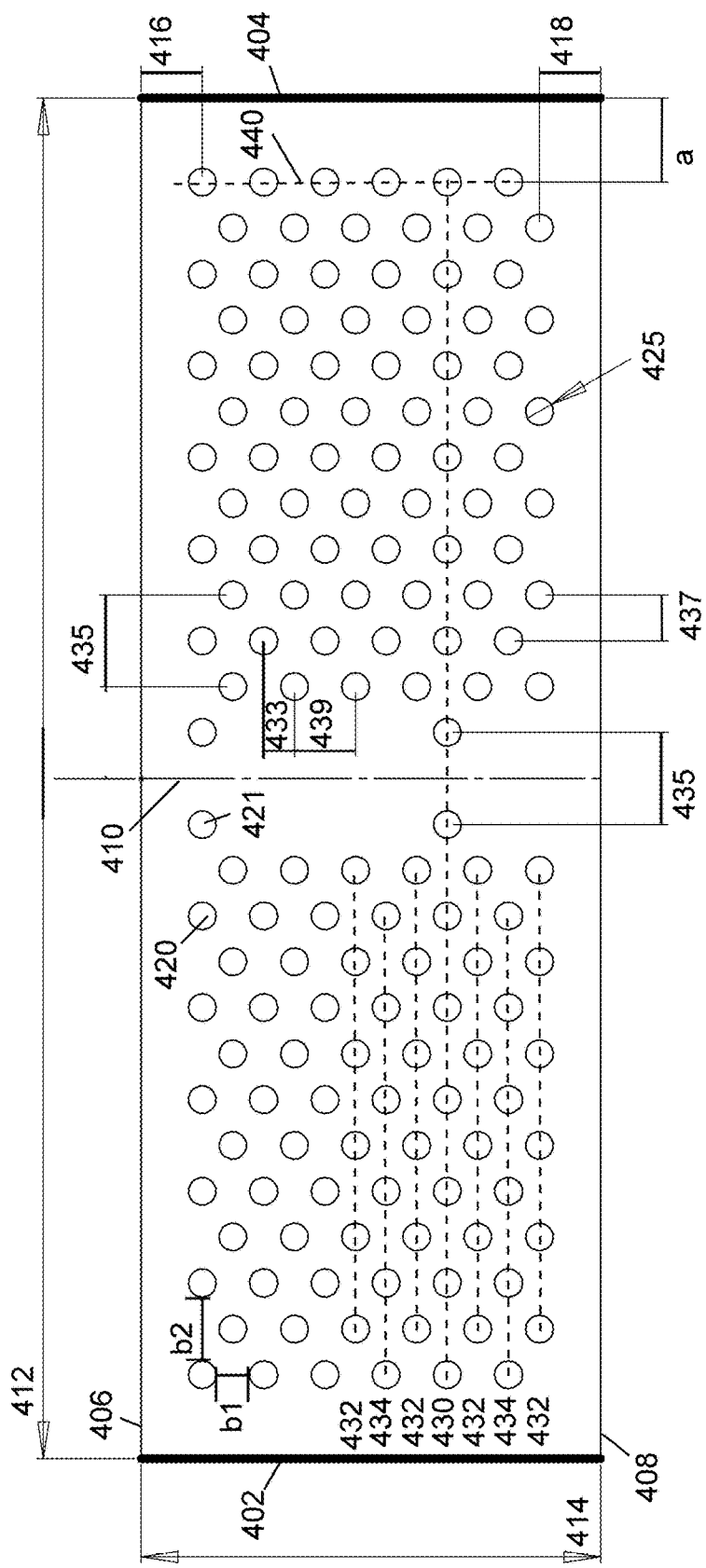
FIG. 4A is a plan view of a first exemplary cell wall of the present disclosure, showing a single pattern of perforations across the cell wall.

FIG. 4A is a plan view showing one example of a cell wall 400 of the present disclosure, where the perforations are arranged in a single pattern across the cell wall. The cell wall is defined by a first edge seam 402 and a second edge seam 404 on its sides. These two seams would be welded to a polymeric strip to form the cell, and correspond to the "height" of the geocell. A central seam 410 is also present in the middle of the cell wall, which would be welded to a different polymeric strip than the two edge seams (see FIG. 2 for clarification). A top edge 406 runs from the top end of the first edge seam to the top end of the second edge seam, and defines the top of the cell. A bottom edge 408 runs from the bottom end of the first edge seam to the bottom end of the second edge seam, and defines the bottom of the cell. The cell wall 400 has a length of 222.5mm in each direction from the central seam, and a total length 412 of 445 mm. The cell wall also has a total height 414 of 200 mm.

A single pattern of perforations 420 is present on the cell wall in FIG. 4A. In a "pattern", all of the perforations are arranged in a series of at least three adjacent lateral lines that are parallel to each other, each lateral line having a plurality of perforations. In each lateral line, a constant distance is maintained between all adjacent perforations. In addition, a constant distance is maintained between all adjacent lateral lines.

This definition of a "pattern" may be better understood by reference to FIG. 4A. FIG. 4A contains a total of 22 lateral lines, as indicated by reference numerals 430, 432, 434. In each lateral line, a constant distance 435 is maintained between all adjacent perforations, as measured from the center of the perforations. Adjacent lateral lines 432, 434 are staggered relative to each other. This results in a lateral distance 437 between the centers of adjacent staggered perforations (i.e. in different lateral lines). Put another way, reference numerals 430, 432, 434 designate three different sets of lateral lines. There is a vertical distance 439 between lateral lines that have their end perforations in a parallel vertical line, and a constant distance 433 between adjacent lateral lines.

The term "single" refers to the fact that there is only one pattern on the entire cell wall. At least one of the lateral lines extends across the entirety of the cell wall, so that the two end perforations of that lateral line are within an edge distance a of the edge seams, the edge distance being a maximum of 35 mm. The pattern of FIG. 4A is considered a single pattern because two of the lateral lines (reference numeral 430) extend across the entirety of the cell wall. In this regard, lateral lines 430 include perforations 421 that are located closer to the central seam 410 than the perforations in lateral lines 432, 434.

It should be noted that in the various embodiments described herein, the two sets of lateral lines 432, 434 do not extend across the central seam 410. Only the set of lateral lines 430 extends across the central seam 410. Generally, half of the lateral lines 432 are on one side of the central seam 410, and the other half of the lines 432 are on the other side of the central seam. This will be illustrated further herein.

The perforations closest to each edge seam are generally located about the same distance from the edge seam. The vertical line formed by the point of each perforation closest to the edge seam will be referred to herein as a vertical perimeter line, and one such vertical perimeter line is indicated here with reference numeral 440. The edge distance between the edge seam 404 and the vertical perimeter line 440 is marked with reference letter a. Due to manufacturing tolerances, this edge distance a should be measured as the average distance from each perforation in the vertical perimeter line. For example, in FIG. 4A there are 12 different perforations (six near first edge seam 402, and six near second edge seam 404), and their distances should be averaged. In embodiments, the edge distance a may be from 0 mm to 35 mm. In more specific embodiments, the edge distance a is from 10 mm to 30 mm.

Also seen is distance b1, which is the vertical distance between adjacent perforations (in the same vertical line). Distance b2 is the horizontal distance between adjacent perforations (in the same horizontal line). It should be noted that the distances a, b1, and b2 are the distances between the perimeters of the perforations, not the centers of the perforations like some of the other distances are measured. In some embodiments, the two distances b1, b2 are each independently from 1 times the edge distance a to 5 times the edge distance a. In more specific embodiments, the two distances b1, b2 are each independently from 1.1 times the edge distance a to 3 times the edge distance a. This means that the perforations are further apart from each other than from the edge seam.

The distance from the top edge to the adjacent line of perforations is marked by reference number 416, and is measured from the top edge to the center of the perforations. The distance from the bottom edge to the adjacent line of perforations is marked by reference number 418, and is measured from the bottom edge to the center of the perforations. Due to manufacturing tolerances, these distances should be measured as the average distance from each perforation in the given line of perforations. These two distances 416, 418 are 25 mm or less, including from 5 mm to 25 mm.

By way of contrast, the prior art cell wall shown in FIG. 1 has four patterns of perforations, not a single pattern. As explained above, a pattern is formed from lateral lines in which a constant distance is maintained between all adjacent perforations. The distance D3 separates the perforations into two groups, because D3 is greater than the distance between perforations in each group (compare D3 to D4). In addition, the distance D6 separates the perforations into two more groups, because D6 is greater than the distance between adjacent lines of perforations (compare D6 to D5). Each group itself can be considered a single pattern because the perforations maintain a constant distance D4/D5 between adjacent perforations in a given direction, but then there are four patterns on the cell wall, not a single pattern.

Figure 4B:
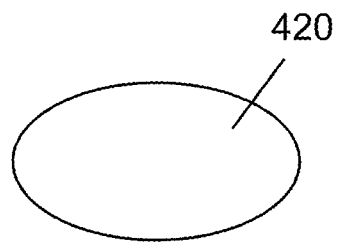
FIG. 4B illustrates a perforation in the shape of an oval.
Figure 4C:
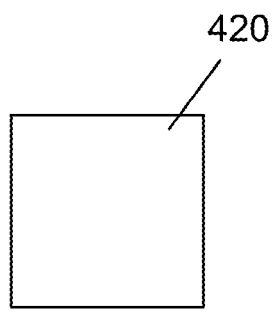
FIG. 4C illustrates a perforation in the shape of a square.
Figure 4D:
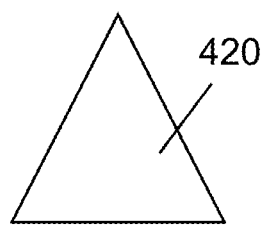
FIG. 4D illustrates a perforation in the shape of a triangle.

As shown in FIG. 4A, each perforation 420 is circular, and has a diameter 425 from about 7 mm to about 30 mm, including from about 7 mm to about 15 mm. It is contemplated that the perforations could be of a different shape, as long as the area of each perforation falls within the area defined by a circle having a diameter of about 7 mm to about 30 mm, including from about 7 mm to about 15 mm. For example, the perforation could be an oval, a square, or a triangle, as illustrated in FIG. 4B, FIG. 4C, and FIG. 4D, respectively. In the case of a non-circular perforation, the diameter is the longest line that extends through the centroid of the perforation. In particular embodiments, the total area of the perforations is from about 5% to about 18% of the area of the cell wall.

Additional aspects of the cell wall of FIG. 4A are seen in FIG. 5. Here, lengths are indicated in millimeters (mm). Each perforation has a diameter of 9 mm. The centers of adjacent perforations in the same lateral line are spaced apart from each 30 mm in the lateral. Adjacent lateral lines are staggered relative to each other, so that lateral lines whose ends meet in the same vertical line are spaced apart by 20 mm. Similarly, there is a distance of 15 mm between the centers of adjacent staggered perforations. The top line of perforations is 20 mm from the top edge. The bottom line of perforations is 20 mm from the bottom edge. The vertical perimeter line of perforations closest to each edge seam is 27.5 mm from the edge seam, measured from the center of the perforations.

The single pattern illustrated here contains 22 lateral lines. 20 lateral lines 432, 434 have six perforations. The other two lateral lines (reference numeral 430) have 14 perforations, with two of the perforations (reference numeral 421) in each lateral line being closer to the central seam than the other 20 lateral lines. The 20 lateral lines can be separated into two sets, which are staggered separately from each other such that their end perforations are arranged in different parallel vertical lines. Dotted lines 442 show the arrangement of the set of lateral lines 432, while dotted lines 444 show the arrangement of the other set of lateral lines 434. The other lateral lines 430 are arranged to have their end perforations in the same vertical line as the set 434.

A ribbon 450 having a length 452 parallel to the edge seams 402, 404 and a 35-mm width is shown here in dotted line. The ribbon extends from the top edge 406 to the bottom edge 408, not from the first edge seam 402 to the second edge seam 404. No matter where this ribbon is located along the pattern of FIG. 5, there will always be at least one perforation located on the ribbon. Here, the ribbon contains 12 perforations. The ribbon also divides six perforations in half; because these are not complete perforations, they are not considered.

Referring back again to prior art FIG. 1, D3 has a width of 41.3 mm. Thus, it is possible to locate a 40-mm-wide ribbon along this pattern of perforations that does not contain any perforations (illustrated as reference numeral 450, solid rectangle). In the present perforation patterns, any 40-mm-wide ribbon will contain at least one perforation, and usually contains a plurality of perforations arranged in a line.

Generally speaking, the single pattern described herein is such that when the strip is loaded in tensile mode with a load of 6.0 kN/m for wall thickness of 1.2 mm to 1.5 mm or 0.4 kN/m for wall thicknesses of 1.0 mm to 1.2 mm at 23° C. until the strip has increased in length by 12%, and the measurements are then taken, the increase in perforation diameter in the stress direction (average of at least 3 perforations in the most affected line) is at most 15%. The measurement is taken in the line of perforations most affected by the stress, and the value of the increase in perforation diameter is an average of at least 3 perforations in that line.

Figure 6:
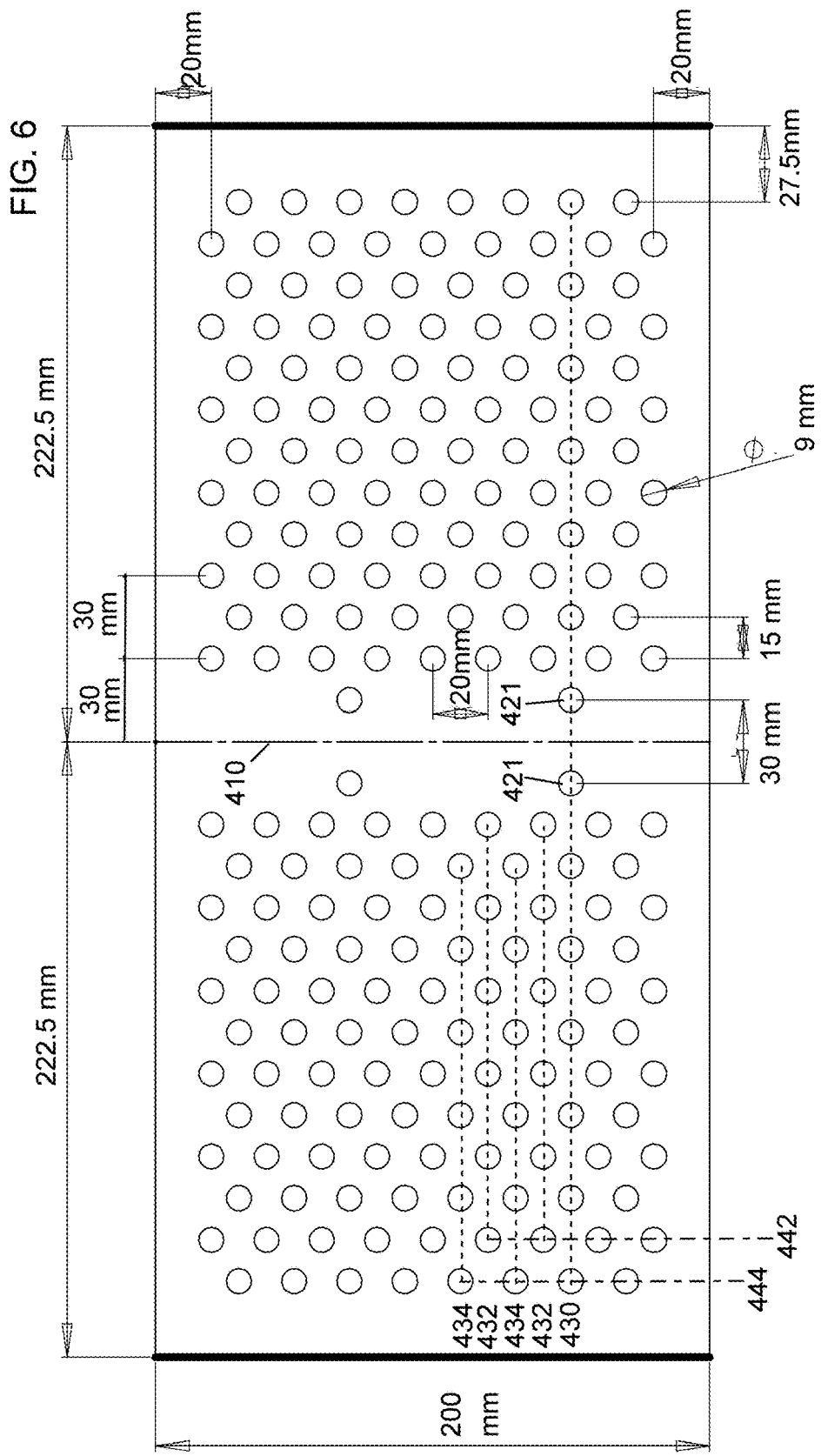
FIG. 6 is a plan view of another exemplary cell wall of the present disclosure.

FIG. 6 is another exemplary embodiment of a geocell with a perforation pattern of the present disclosure. Here, the total cell wall length is 445 mm (labeled here as two halves of 222.5 mm length). The total cell wall height is 200 mm. Each perforation is illustrated with a diameter of 9 mm. The centers of adjacent perforations in each lateral line are spaced apart from each 30 mm in the lateral direction. Lateral lines whose ends meet in the same vertical line are spaced apart by 20 mm. There is a distance of 15 mm between the centers of adjacent staggered perforations. The top line of perforations is 20 mm from the top edge. The bottom line of perforations is 20 mm from the bottom edge. The vertical perimeter line of perforations closest to each edge seam is 27.5 mm from the edge seam, measured from the center of the perforations. The single pattern of perforations is made up of 30 lateral lines having six perforations and organized into two different sets 432, 434, and two other lateral lines 430 having 14 perforations, with two of the perforations (reference numeral 421) in these lateral lines being closer to the central seam 410 compared to the other 30 lateral lines. The one set of lateral lines 432 are arranged so their end perforations are arranged in vertical parallel lines 442. The other set 434 is arranged with the two lateral lines 430 so their end perforations are arranged in vertical parallel lines 444.

Figure 7:
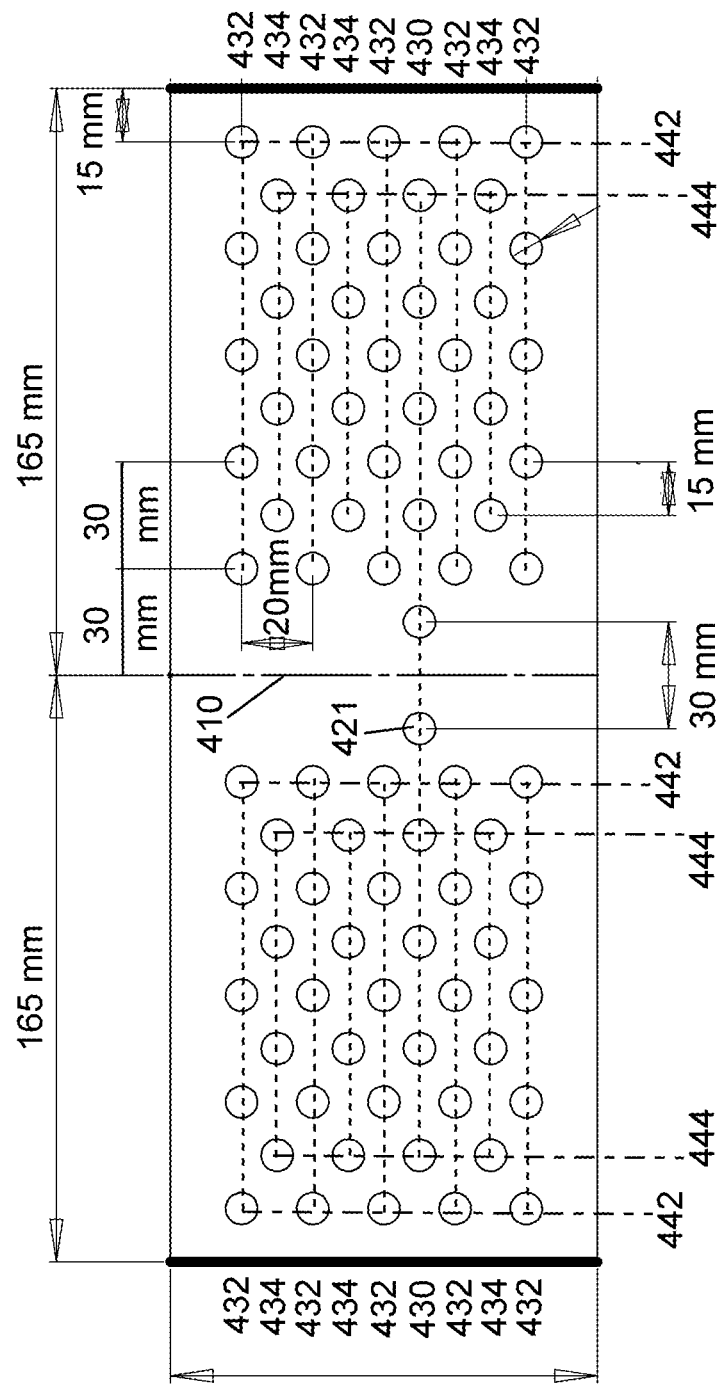
FIG. 7 is a plan view of another exemplary cell wall of the present disclosure.

FIG. 7 is another exemplary embodiment of a geocell with a perforation pattern of the present disclosure. Here, the total cell wall length is 330 mm (labeled here as two halves of 165 mm length). The total cell wall height is 120 mm (not shown). Each perforation is illustrated with a diameter of 9 mm. The centers of adjacent perforations in each lateral line are spaced apart from each 30 mm in the lateral direction. Lateral lines whose ends meet in the same vertical line are spaced apart by 20 mm. There is a distance of 15 mm between the centers of adjacent staggered perforations. The top line of perforations is 20 mm from the top edge (not shown). The bottom line of perforations is 20 mm from the bottom edge (not shown). The vertical perimeter line of perforations closest to each edge seam is 15 mm from the edge seam, measured from the center of the perforations. The single pattern of perforations is made up of a first set 432 of 10 lateral lines having five perforations, a second set 434 of three lateral lines having four perforations, and a third set 430 of one lateral line having 10 perforations, with two of the perforations (reference numeral 421) in this lateral line being closer to the central seam 410 compared to the other lateral lines. The pattern of FIG. 7 is considered a single pattern because two of the lateral lines (reference numeral 430) extend across the entirety of the cell wall.

The one set of lateral lines 432 are arranged so their end perforations are arranged in vertical parallel lines 442. The other set 434 is arranged with the two lateral lines 430 so their end perforations are arranged in vertical parallel lines 444. It should be noted that in the various embodiments described herein, generally the two sets of lateral lines are organized so that half of the lines are on one side of the central seam 410, and half of the lines are on the other side of the central seam. Here, all of the lateral lines are illustrated so that this arrangement is seen.

Figure 8:
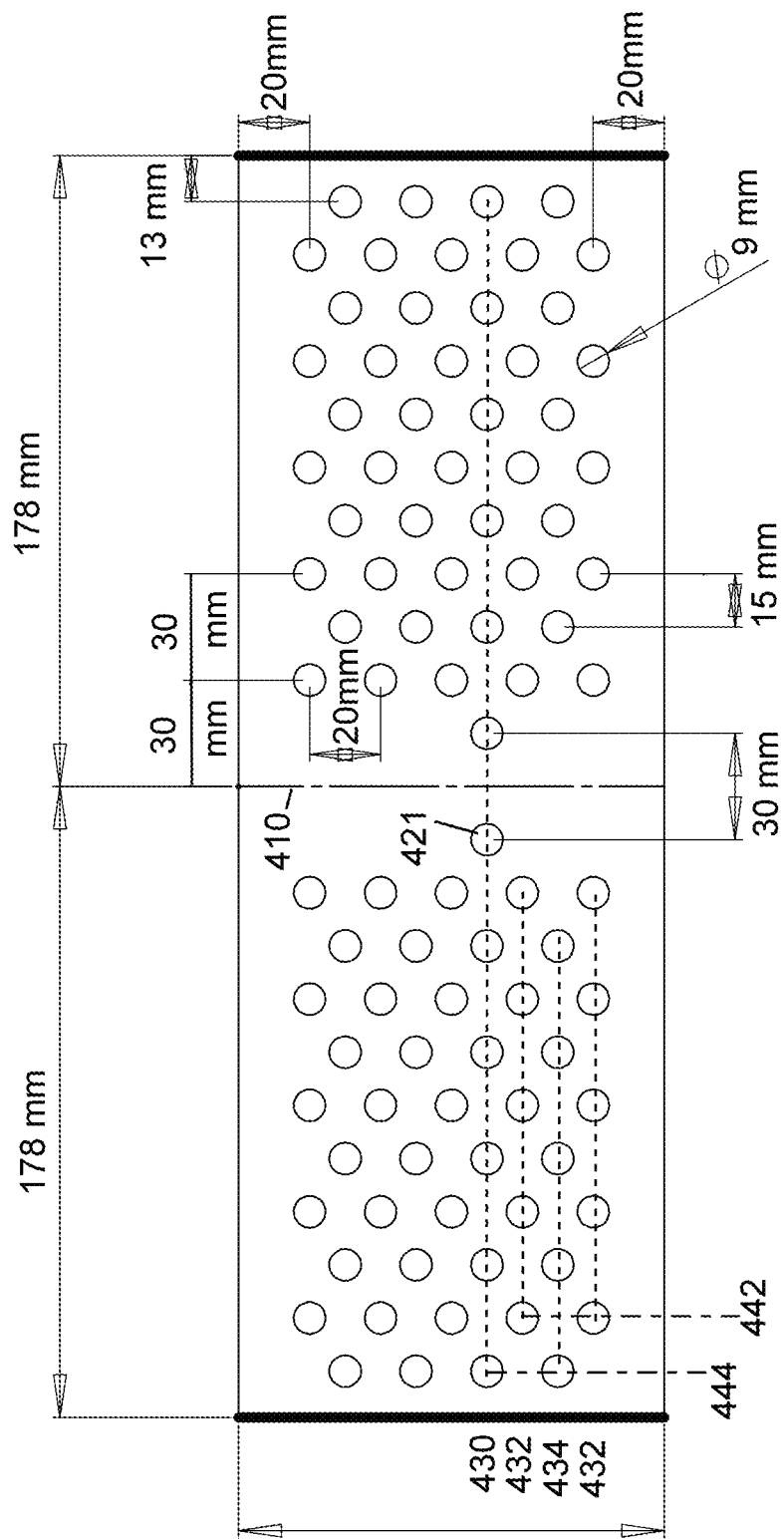
FIG. 8 is a plan view of another exemplary cell wall of the present disclosure.

FIG. 8 is another exemplary embodiment of a geocell with a perforation pattern of the present disclosure. Here, the total cell wall length is 356 mm (labeled here as two halves of 178 mm length). The total cell wall height is 120 mm (not shown). Each perforation is illustrated with a diameter of 9 mm. The centers of adjacent perforations in each lateral line are spaced apart from each 30 mm in the lateral direction. Lateral lines whose ends meet in the same vertical line are spaced apart by 20 mm. There is a distance of 15 mm between the centers of adjacent staggered perforations. The top line of perforations is 20 mm from the top edge. The bottom line of perforations is 20 mm from the bottom edge. The vertical perimeter line of perforations closest to each edge seam is 13 mm from the edge seam, measured from the center of the perforations. The single pattern of perforations is made up of 16 lateral lines having five perforations and organized into two different sets, and one other lateral line having 12 perforations, with two of the perforations (reference numeral 421) in this lateral line being closer to the central seam 410 compared to the other lateral lines. The one set of lateral lines 432 are arranged so their end perforations are arranged in vertical parallel lines 442. The other set 434 is arranged with the two lateral lines 430 so their end perforations are arranged in vertical parallel lines 444.

Figure 9:
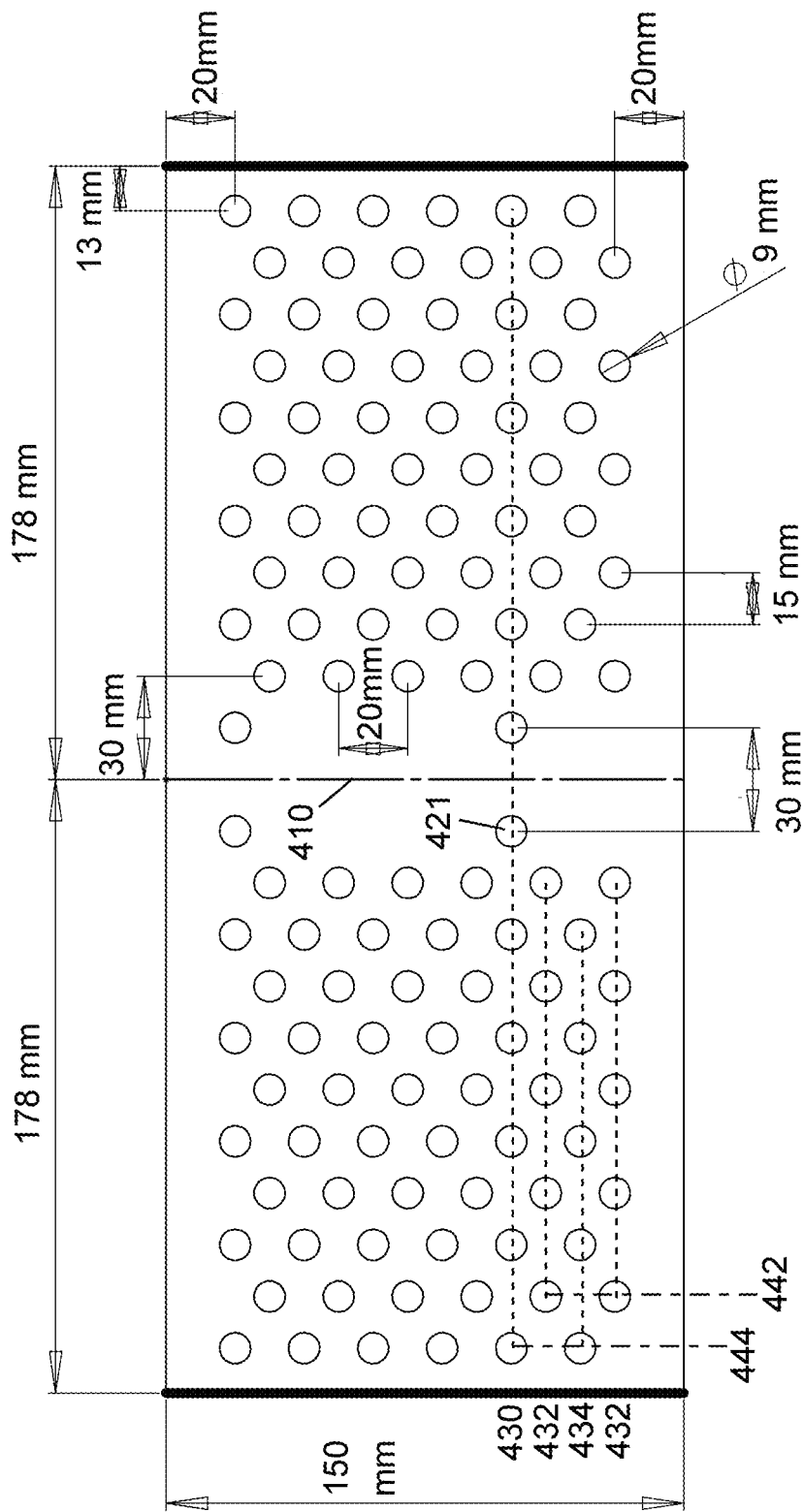
FIG. 9 is a plan view of another exemplary cell wall of the present disclosure.

FIG. 9 is another exemplary embodiment of a geocell with a perforation pattern of the present disclosure. Here, the total cell wall length is 356 mm (labeled here as two halves of 178 mm length). The total cell wall height is 150 mm. Each perforation is illustrated with a diameter of 9 mm. The centers of adjacent perforations in each lateral line are spaced apart from each 30 mm in the lateral direction. Lateral lines whose ends meet in the same vertical line are spaced apart by 20 mm. There is a distance of 15 mm between the centers of adjacent staggered. The top line of perforations is 20 mm from the top edge. The bottom line of perforations is 20 mm from the bottom edge. The vertical perimeter line of perforations closest to each edge seam is 13 mm from the edge seam, measured from the center of the perforations. The single pattern of perforations is made up of 20 lateral lines having five perforations and organized into two different sets, and two other lateral lines having 12 perforations, with two of the perforations (reference numeral 421) in these lateral lines being closer to the central seam 410 compared to the other lateral lines. The one set of lateral lines 432 are arranged so their end perforations are arranged in vertical parallel lines 442. The other set 434 is arranged with the two lateral lines 430 so their end perforations are arranged in vertical parallel lines 444.

Figure 10:
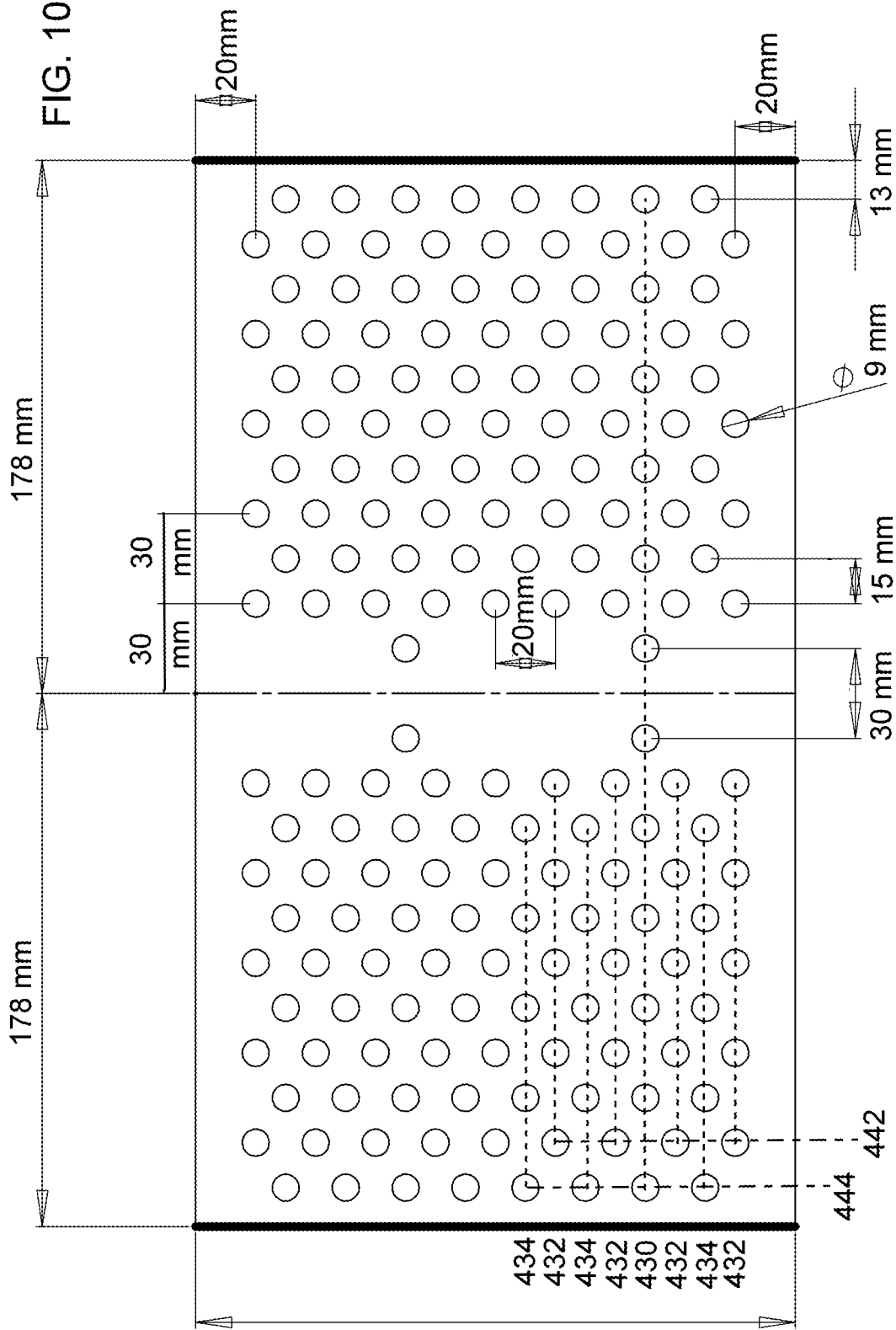
FIG. 10 is a plan view of another exemplary cell wall of the present disclosure.

FIG. 10 is another exemplary embodiment of a geocell with a perforation pattern of the present disclosure. Here, the total cell wall length is 356 mm (labeled here as two halves of 178 mm length). The total cell wall height is 200 mm (not shown). Each perforation is illustrated with a diameter of 9 mm. The centers of adjacent perforations in each lateral line are spaced apart from each 30 mm in the lateral direction. Lateral lines whose ends meet in the same vertical line are spaced apart by 20 mm. There is a distance of 15 mm between the centers of adjacent staggered perforations. The top line of perforations is 20 mm from the top edge. The bottom line of perforations is 20 mm from the bottom edge. The vertical perimeter line of perforations closest to each edge seam is 13 mm from the edge seam, measured from the center of the perforations. The single pattern of perforations is made up of 30 lateral lines having five perforations and organized into two different sets, and two other lateral lines having 12 perforations, with two of the perforations (reference numeral 421) in these lateral lines being closer to the central seam 410 compared to the other lateral lines. The one set of lateral lines 432 are arranged so their end perforations are arranged in vertical parallel lines 442. The other set 434 is arranged with the two lateral lines 430 so their end perforations are arranged in vertical parallel lines 444.

The perforation patterns of FIGS. 5-10 can generally be described as being formed from lateral lines made up of the perforations, with the lateral lines being arranged in a staggered pattern relative to each other. In a given group of x lateral lines, m lateral lines will have n perforations, and (x-m) lateral lines may have (n+1) perforations, with the extra perforation being closer to the central seam. The value (x-m) can be zero, or can be one or more. In particular embodiments, (x-m) is one or two.

The perforated geocells of the present disclosure distribute their stress more evenly, so that the load can be increased. When the geocells fail, they generally do so along the seams, without deformation of the perforations and the cell wall.

These geocells are useful in applications such as reinforcement of roads, pavements, railways, parking lots; linings in channels, ponds, reservoirs, landfills, dams, barriers, terraces; and retaining walls.

The present disclosure will further be illustrated in the following non-limiting working examples, it being understood that these examples are intended to be illustrative only and that the disclosure is not intended to be limited to the materials, conditions, process parameters and the like recited herein.

EXAMPLES

Figure 11:
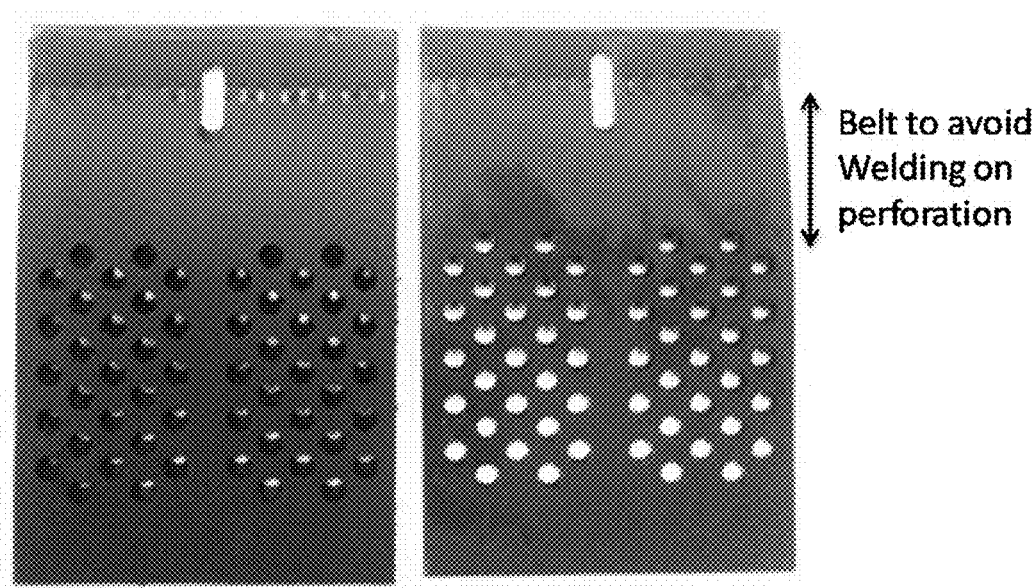
FIG. 11 is a picture of a prior art geocell before tensile testing.

FIG. 11 shows a strip of a prior art geocell prior to tensile testing and application of load. The strip has an edge seam at the top, and is cut along the central seam (at the bottom of the strip). As seen here, there is a significant area without perforation at the top of the strip, which is usually present to avoid welding on perforations.

The wall strength of the strip was calculated according the following procedure. A strip is cut from a geocell wall, to a length of at least 100 mm, preferably coming from an area adjacent to a seam. The strip is tested for the load at yield or the load at break, whichever is the first to occur. The strip is tested in the direction perpendicular to the seam. The strain rate is adapted so the ratio between {deformation rate (mm/minute)} and {distance between clamps in mm when test starts} is 150:100, or in other words, the strain rate is 150%/min. The measured load at yield or break in Newtons (N) is divided by the strip width (corresponding to the cell wall height), in meters. The result is the actual offered geocell wall strength, in N/m.

The measurement of splitting resistance is according to ISO 13426-1 (method C). The term "seam splitting strength" is used herein to refer to the load that causes the seam or strip (whichever is first to fail) to rupture according to ISO 13426-1 (method C), normalized to units of N/m.

Figure 12:
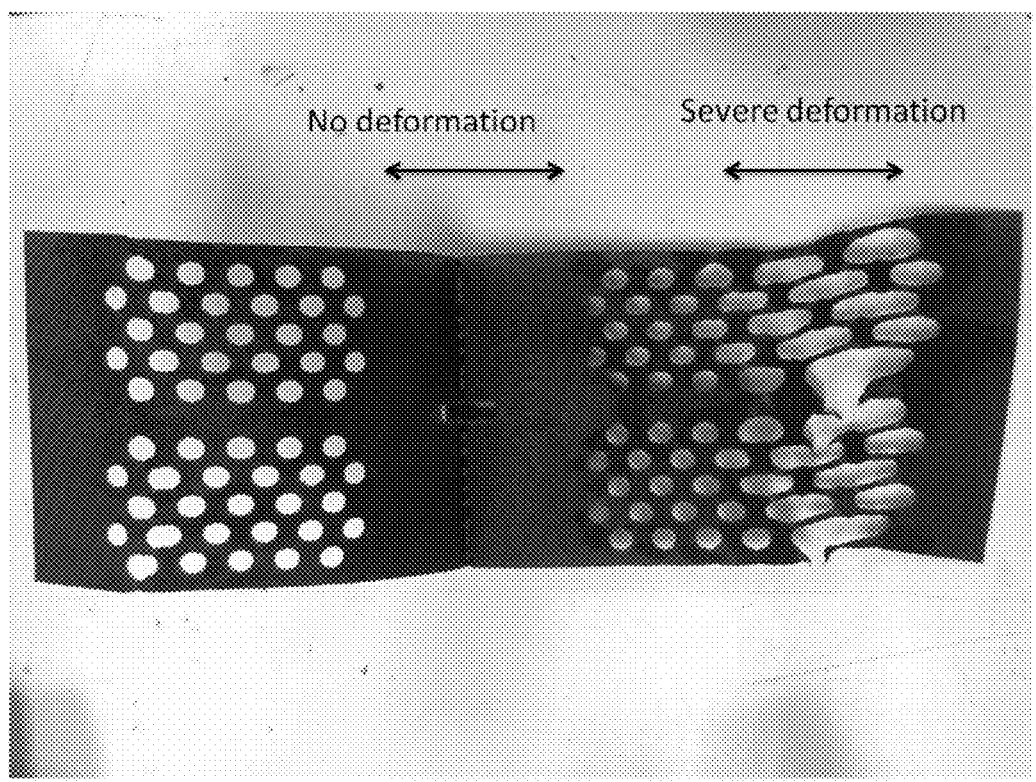
FIG. 12 is a picture of the prior art geocell after tensile testing, showing deformation in the perforated areas.

FIG. 12 shows the prior art strip after being loaded to yield. For a 1.5 mm thick strip, 100 mm wide, the load at yield was 1200 N. The perforations are severely deformed, whereas the non-perforated belt is not deformed. This product has a weak "bottleneck" zone. This strip has about 50% of the strength of a non-perforated strip, but the perforations are about 18% of the cell wall area. This is attributed to stress concentration in the groups of perforations.

Figure 13:
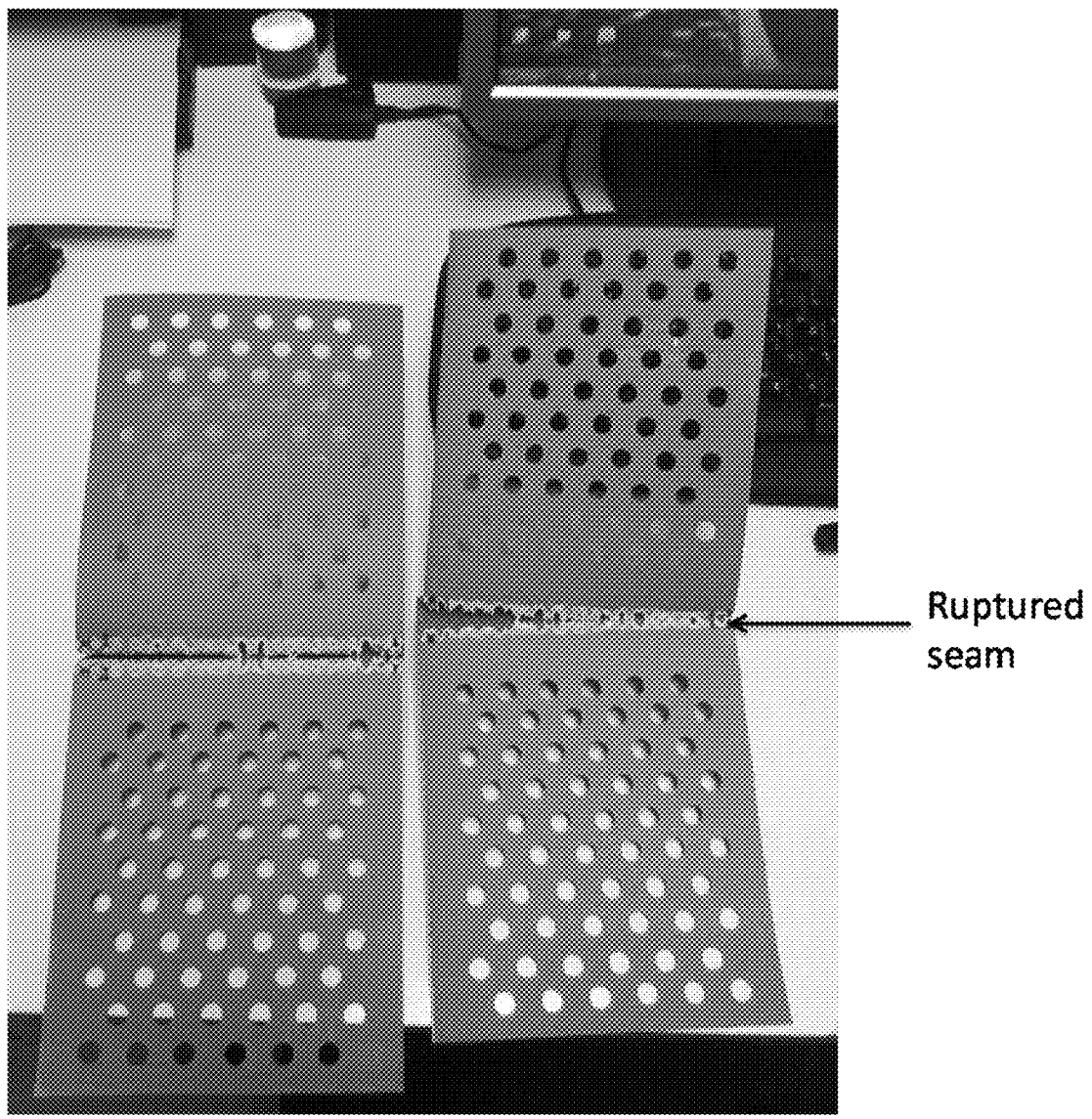
FIG. 13 is a picture of a perforated geocell of the present disclosure after tensile testing, showing rupturing along the seam instead of in the perforated area.

FIG. 13 shows a strip of a geocell of the present disclosure, with the perforations taking up significantly more area of the cell wall, and being spread out in two groups. This picture is after the strip has been loaded to yield. For a 1.3 mm thick strip, 100 mm wide, the load at yield was 2200 N, which is significantly higher than the prior art strip. The perforations are not deformed, and the strip ruptured along the seam.

Figure 14:
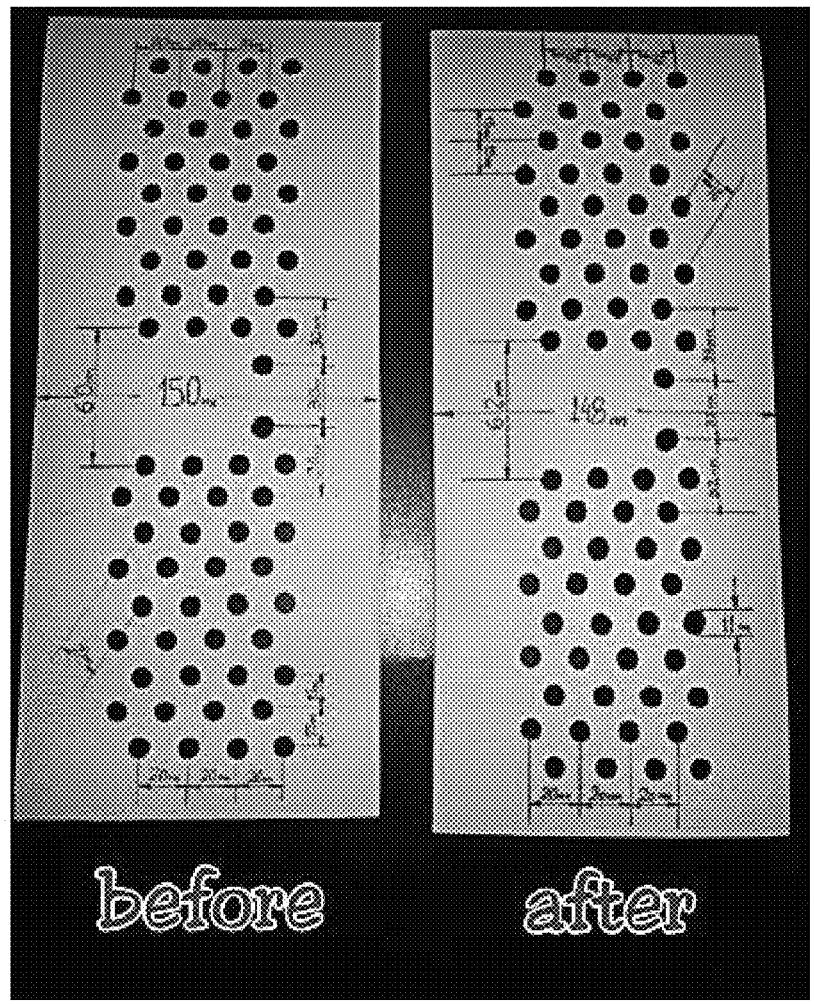
FIG. 14 is a picture of a geocell strip of the present disclosure before (left-hand side) and after (right-hand side) tensile testing.

FIG. 14 shows a strip of a geocell of the present disclosure, both before and after tensile loading (before on the left-hand side, after on the right-hand side). The single pattern of perforations is made up of a first set of six lateral lines having four perforations, a second set of eight lateral lines having five perforations, and a third set of one lateral line having 10 perforations, with two of the perforations in this lateral line being closer to the center. In the "before" strip on the left-hand side, there is a 60-mm distance between the perforations on either side of the central seam. Three 30-mm distances between adjacent perforations are indicated. A 15-mm distance is present between perforations on adjacent lateral lines. Finally, three 20-mm vertical distances are indicated between lateral lines in the same set. The strip has a height of 150 mm, and a length of 330 mm, and a wall thickness of 1.3 mm. Although not indicated, each perforation has a diameter of 9 mm.

A tensile test was conducted at 165 mm/min until the strip yielded at about 12% strain. In the "after" strip on the left-hand side, the 60-mm distance has increased to 62 mm. The 30-mm distances have increased to 32-33 mm. The 15-mm distance between perforations on adjacent lateral lines has not changed. The 20-mm vertical distances have not changed. The strip height has changed from 150 mm to 148 mm. The strip length changed to 341 mm, and the wall thickness decreased to 1.28 mm. The diameter of the perforation increased from 9 mm to 11 mm. This increase in perforation diameter is about 22% of the original perforation diameter. These distortions are very small, and very difficult to see. The change in the strip length was 3.3%.

Figure 15:
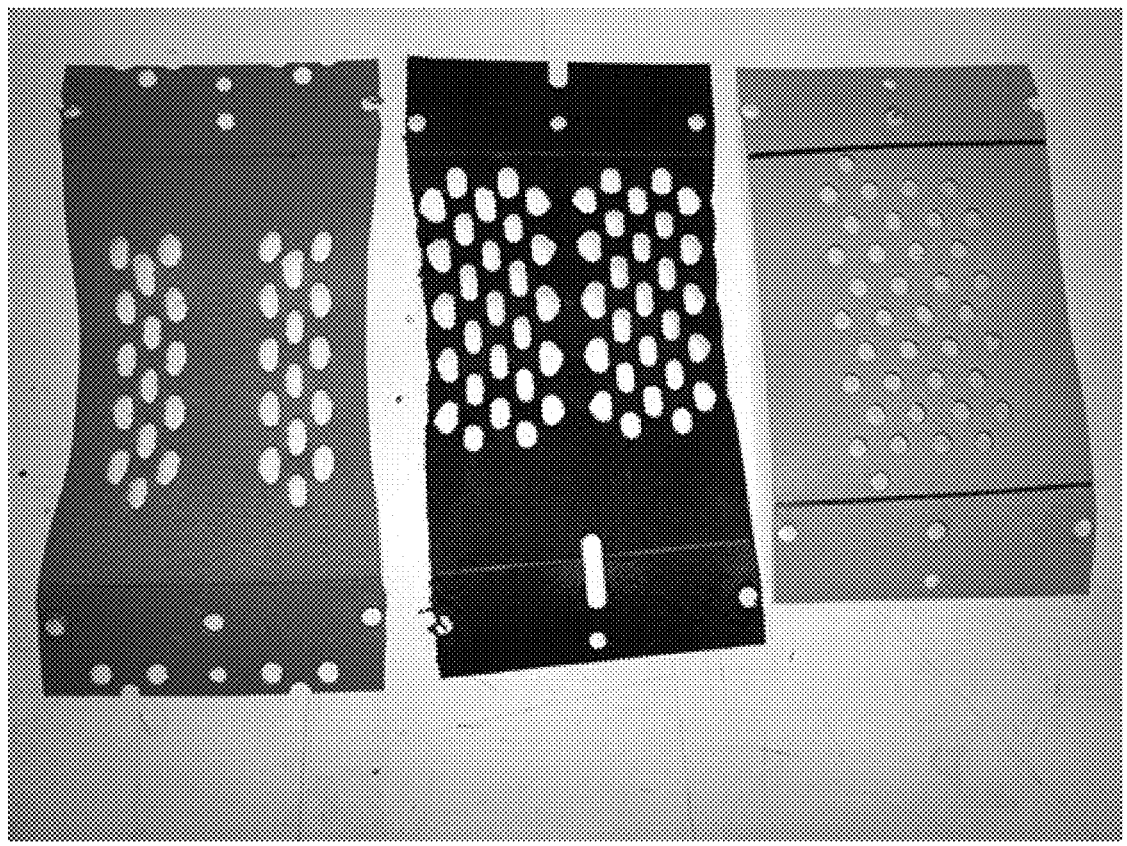
FIG. 15 is a picture showing three strips having different perforation patterns, after tensile loading, two strips being prior art and one being of the present disclosure.

FIG. 15 is another set of pictures showing three different strips after load testing. The loading was at 6 kN/m load for a period of 96 hours at 23 degrees Celsius. The left-most strip is brown, and has two separate groups of perforations located along the center of the strip, the perforations having a starting diameter of 10 mm. The left-most strip had a starting wall thickness of 1.50 mm, and a starting length of 165 mm. There are two wide areas having no perforations at either end of the strip. The center strip is black, and has two separate groups of perforations located closer to the top end of the strip, the perforations having a starting diameter of 10 mm. The center strip had a starting wall thickness of 1.55 mm, and a starting length of 165 mm. There is one wide area having no perforations at the bottom end of the strip. The left-most and center strips have perforations in different prior art patterns. The right-most strip is a strip of the present disclosure. A single perforation pattern stretches across the strip (indicated by the black lines), the perforations having a starting diameter of 9 mm. The right-most strip had a starting wall thickness of 1.3 mm, and a starting length of 165 mm.

Figure 16:
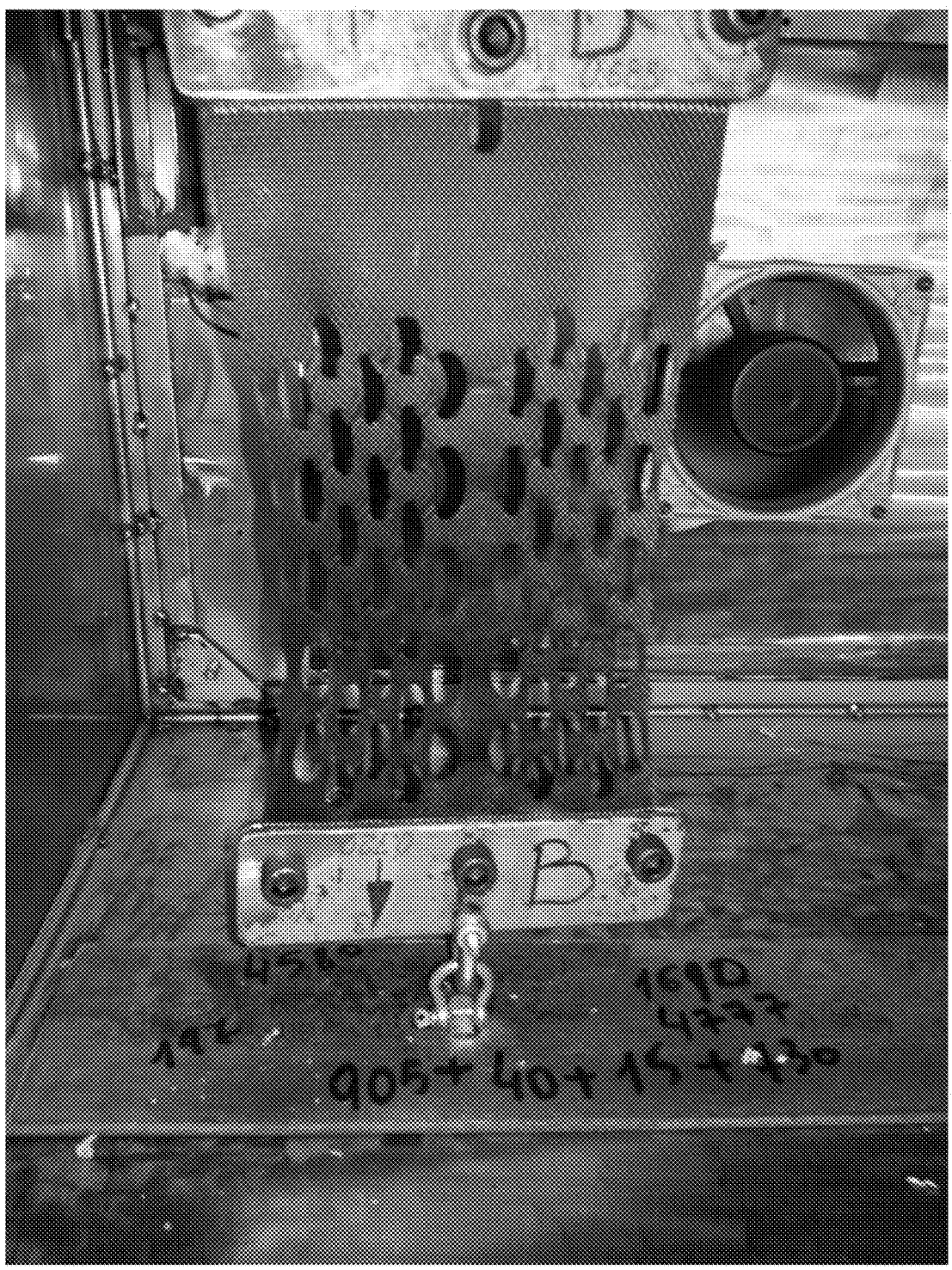
FIG. 16 is a picture showing one of the strips of FIG. 15 in a tensile loading test apparatus per ASTM D6992.

These strips were loaded with a load of 6 kiloNewtons per meter, for 90 minutes at room temperature. FIG. 16 is a picture of the center strip during this testing period. Referring back to FIG. 15, the deformation of the left-most and center strips (prior art) is most easily visible in the form of the perforations which were originally circular, but are now very oval-shaped or elliptical. The final perforation diameter of these two strips was greater than 15 mm, i.e. an increase of over 50%. In contrast, the circular perforations on the right-most strip still maintain their circular shape. The right-most strip had final perforation diameters of less than 10 mm. In addition, the left-most strip had an ending wall thickness of 1.45 mm, and an ending length of 186 mm. The center strip had an ending wall thickness of 1.45 mm, and an ending length of 180 mm. The right-most strip had an ending wall thickness of 1.28 mm, and an ending length of 170 mm.

The left-most strip had a starting length of 165 mm, and a final length of 186 mm, for a strip length increase of 12.7%. The perforation diameter increased by over 50%. This performance would not meet the second test described herein.

The center strip had a starting length of 165 mm, and a final length of 180 mm, for a strip length increase of 9.1%. The perforation diameter increased by over 50%. This performance would not meet the second test described herein.

The right-most strip had a starting length of 165 mm, and a final length of 170 mm, for a strip length increase of 3.0%. The perforation diameter increased by less than 11%. This performance is predicted to meet the second test described herein.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A geocell formed from a plurality of polymeric strips, adjacent strips being bonded together along weld lines to form a plurality of cells having cell walls when stretched in a direction perpendicular to the faces of the strips;

wherein at least one strip contains a cell wall having a first edge seam, a second edge seam, a central seam, and a plurality of perforations that have a diameter of from about 7 mm to about 30 mm;

wherein the perforations are arranged in a series of adjacent lateral lines with a constant distance maintained between adjacent perforations in each lateral line and a constant vertical distance maintained between each adjacent lateral line; and wherein the series of adjacent lateral lines define a single pattern such that the perforations in at least one of the lateral lines extend across the entire cell wall and such that any ribbon having a width of 40 mm and a length equal to and parallel to the first edge seam will have at least one perforation.

2. The geocell of claim 1, wherein the perforations have a diameter from about 7 mm to about 15 mm.

3. The geocell of claim 1, wherein the perforations are circular and have a diameter from about 7 mm to about 15 mm.

4. The geocells of claim 1, wherein the perforations are non-circular and have an area equal to a circle having a diameter from about 7 mm to about 30 mm.

5. The geocell of claim 1, wherein the perforation pattern is such that when the strip has a wall thickness of 1.2 mm to 1.5 mm and is loaded in tensile mode with a load of 6.0 kN until the strip increases in length by 12%, the increase in perforation diameter in the stress direction, taken as an average of at least 3 perforations in the most affected line, is at most 15%.

6. The geocell of claim 1, wherein the perforation pattern is such that when the strip has a wall thickness of 1.0 mm to 1.2 mm and is loaded in tensile mode with a load of 4.0 kN until the strip increases in length by 12%, the increase in perforation diameter in the stress direction, taken as an average of at least 3 perforations in the most affected line is at most 15%.

7. The geocell of claim 1, wherein the strips have a wall thickness of 0.25 mm to 1.7 mm.

8. The geocell of claim 1, wherein the strips have a wall thickness of 0.5 mm to 1.35 mm.

9. The geocell of claim 1, wherein the cell walls of the geocell are smooth.

10. The geocell of claim 1, wherein the distance between the first edge seam and the second edge seam in an un-expanded state is at least 250 mm.

11. The geocell of claim 1, wherein the total area of the perforations in the perforated cell wall is from about 5% to about 18% of the area of the perforated cell wall.

12. A geocell formed from a plurality of polymeric strips, adjacent strips being bonded together along weld lines to form a plurality of cells having cell walls when stretched in a direction perpendicular to the faces of the strips;

wherein at least one strip contains a cell wall having a first edge seam, a second edge seam, a central seam, and a plurality of perforations that have a diameter of from about 7 mm to about 30 mm; and wherein the perforations are arranged in a series of adjacent lateral lines, with a constant distance maintained between adjacent perforations in each lateral line and a constant vertical distance maintained between each adjacent lateral line;

wherein the series of adjacent lateral lines define a single pattern such that the perforations in at least one of the lateral lines extend across the central seam and such that any ribbon having a width of 40 mm and a length equal to and parallel to the first edge seam will have at least one perforation; and wherein the perforations closest to the first edge seam are spaced from the first edge seam by an edge distance, as measured from the center of the perforations.

13. The geocell of claim 12, wherein the edge distance is from 0 mm to 30 mm.

14. The geocell of claim 12, wherein the distance between adjacent perforations is from 1 times the edge distance to 5 times the edge distance.

15. The geocell of claim 12, wherein the edge distance is 35 mm or less.

\* \* \* \* \*